United States Patent Office

3,495,963
Patented Feb. 17, 1970

---

3,495,963
SIMULTANEOUS STAINING AND STRENGTH-
ENING OF GLASS
Michael J. Buckley, Brackenridge, Robert G. Twells, New
Kensington, and Albert J. Timko, Pittsburgh, Pa., assignors to PPG Industries, Inc., a corporation of
Pennsylvania
No Drawing. Filed Apr. 13, 1965, Ser. No. 447,904
Int. Cl. C03c 3/20
U.S. Cl. 65—30                                              9 Claims

ABSTRACT OF THE DISCLOSURE

The present invention relates to the manufacture of transparent, colored, strengthened glass articles. More particularly, the invention relates to a method of simultaneously staining and strengthening alkali metal containing glasses by a multiple ion exchange treatment conducted below the strain point of the glass article. More specifically, this invention pertains to a novel method of simultaneously straining and strengthening an alkali metal containing glass by contacting said glass at a temperature below its strain point with a molten salt mixture containing an alkali metal salt of an alkali metal having a larger atomic diameter than an alkali metal ion of said glass and a salt capable of coloring the glass by ion exchange such as a silver salt.

---

This invention relates to the manufacture of transparent, colored, strengthened glass articles. More particularly, the invention relates to a family of glasses that can be simultaneously colored and strengthened using a multiple ion exchange treatment to produce unique glass articles.

Various ion exchange techniques have been suggested for treating glass articles to increase strength. These ion exchange techniques are divided into two general types. The first of these two types is represented by Hood et al. in U.S. Patent 2,779,136. Hood et al. disclose an ion exchange method in which a smaller sized alkali metal ion of the treating bath is exchanged for a larger sized alkali metal ion in the base glass composition. The substitution of the smaller ion in the glass surface for the larger ion results in a different surface composition which exhibits a lower coefficient of thermal expansion than the base glass composition. The difference in the coefficients of thermal expansion of the surface glass composition and the interior base glass composition results in a high surface compressive stress developing when the glass article is cooled to room temperature. To prevent the development of tensile stress in the surface instead of the desired compressive stress requires that the ion exchange treatment be conducted at a temperature above the strain point of the base glass composition.

The second type of ion exchange technique used to increase the strength of glass is represented by South African Patent No. 622,353. In this type of ion exchange technique, the exchange is conducted at a temperature below the strain point of the base glass composition. The exchange conducted is the substitution of a relatively large alkali metal ion from the treating bath for a relatively smaller alkali metal ion of the base glass composition. Since this ion exchange is conducted at a temperature below the strain point (relaxation point) of the glass, the surface structure does not adequately adjust itself to accommodate the larger sized ions being forced into it. The result is the production of a high surface compressive stress when the glass article is cooled to room temperature. The mechanism involved in essentially mechanical and consists of wedging a larger sized ion into the hole left in the glass surface structure by the removal of a smaller sized ion.

The latter type of ion exchange treatment has also been suggested to be used in conjunction with a thermal tempering operation. This technique of stacking tempering operations is disclosed in a copending application filed Oct. 4, 1962, by Albert R. Hess et al., Ser. No. 228,255.

Certain glass compositions have also been formulated which are able to precipitate crystals of beta-spodumene ($Li_2O \cdot Al_2O_3 \cdot 4SiO_2$) in the glass surface after an ion exchange treatment. This crystalline phase in the glass surface reduces the coefficient of thermal expansion exhibited by the glass surface zone, increasing the strength of the glass article in the same manner as the other ion exchange techniques noted above. This method is also disclosed in U.S. Patent 2,779,136.

It is also known that various colored metal ions, such as silver ions, can be exchanged in glass, J. S. Turnbull and W. W. Weyl, in their article entitled "Staining Glasses with Silver: A Possibility of Studying Inhomogeneities" (The Glass Industry, January 1940), discloses that silver ions can be introduced into glass by migration from an outside source. A technique for precipitating silver by heating the glass under reducing conditions to develop a brownish-yellow silver stain in the glass is also disclosed.

U.S. Patent 2,647,068, issued to Imre Patai, discloses the ion exchange of a soda glass composition in which the ion exchange bath contains a mixture of two different ions such as silver and potassium. The ion exchange disclosed is the exchange of silver from the treating bath for sodium in the base glass composition. The technique disclosed does not involve the exchange of any potassium from the treating bath for alkali metal ions of the glass. No strength improvement is claimed or noted which could be attributed to an exchange of alkali metal ions. It is believed that the Patai technique is one which takes advantage of a preferential exchange of silver ion in glass. The amount of silver ion exchanged develops an opaque mirror-like film on the glass instead of only imparting a tint or stain to the glass.

Characteristically, ion exchange baths containing mixtures of exchangeable ions are found to exhibit preferential or selective ion exchange properties. Usually only the most mobile ion of the bath is found to exchange in the glass surface. This preferential exchange of only the most mobile ion is found to occur even in those mixed baths in which the relative concentration of the most mobile ion is extremely low.

Imre Patai discloses an ion exchange bath containing 80 percent silver nitrate and 20 percent potassium nitrate. Although both silver and potassium ions are present in the bath, Patai indicates that only silver ion or perhaps silver nitrate molecules migrate into the glass. The purpose of adding potassium nitrate to the bath is taught to be only to lower the melting point of the bath mixture.

What has been discovered in the present invention is a technique of simultaneously exchanging at least one noble metal ion and at least one alkali metal ion in a family of lithia-soda-phosphorous pentoxide-alumina silica glasses.

More particularly, what has been discovered is a technique in which thish family of glasses can be substantially and simultaneously ion exchanged by more than one exchangeable ion from the same treating bath to simultaneously color and strengthen the glass. These glass compositions have also been found to ion exchange to significantly greater depths than most commercially used soda-lime-silica glass compositions making possible the production of unique glass articles.

Broadly, the present invention comprises contacting a previously formed glass article with a molten salt bath containing a mixture of exchangeable noble metal ions and alkali metal ions to ion exchange the glass article's surface. The exchange is conducted at a temperature below the strain point of the glass for times ranging from a few seconds to several hours. The exchange of the noble metal ion in the glass surface develops color and some strength improvement in the glass article. The exchange of the alkali metal ion further develops increased strength in the glass article.

The preferred noble metal ion for practicing the present invention is silver ion although other noble metal ions such as gold can be used. Copper may also be used.

The preferred alkali metal ions for practicing the present invention are sodium and potassium ions although larger alkali metal ions such as cesium and rubidium may be used. Lithium ion should not be used at a temperature below the strain point because it tends to develop tensile stresses in the glass surface which cause the glass surface to crack and craze.

The simultaneous multiple ion exchange family of glass compositions of the present invention is broadly described as a soda (and/or potassia)-lithia-$P_2O_5$-alumina-silica base glass family. Representative ranges of the various oxides defining this family of glasses are given below:

| Component: | Percent by weight |
|---|---|
| $Li_2O$ | 2–15 |
| $Na_2O$ and/or $K_2O$ | 2–20 |
| $P_2O_5$ | 1–25 |
| $Al_2O_3$ | 10–35 |
| $SiO_2$ | 30–65 |
| $ZnO$ | 0–12 |
| $MgO$ | 0–8 |
| $B_2O_3$ | 0–10 |
| $ZrO_2$ | 0–8 |

The preferred range of each of the various components indicated above is presented below:

| Component: | Percent by weight |
|---|---|
| $Li_2O$ | 3–6 |
| $Na_2O$ and/or $K_2O$ | 4–12 |
| $P_2O_5$ | 2–12 |
| $Al_2O_3$ | 15–28 |
| $ZnO$ | 0–3 |
| $MgO$ | 0–4 |
| $B_2O_3$ | 0–7 |
| $ZrO_2$ | 0–4 |

Various other oxides in addition to those listed can be incorporated such as CaO, BaO, SrO and PbO.

$TiO_2$ may also be present in amounts not to exceed about 5 percent by weight to adjust the high temperature viscosity characteristics. Various minor additions of colorants, such as compounds containing Fe, Co, Ni, Au, Ag, Cr, Mn, Cu, Se, Pt, and graphite may be added to develop various different final glass colors without impairing the desirable exchange properties of the glass.

Other ingredients which do not add color to the base glass as melted such as small amounts of tin or antimony have been found to modify the characteristic colors imparted by silver ions. For example, antimony added to a base glass composition which is subsequently simultaneously ion exchanged with silver ion and sodium or potassium ion in accordance with the present invention produces a ruby red colored transparent glass article. Other components, such as $As_2O_5$, $Na_2SO_4$, NaCl, and S may also be present in the base glass compositions.

Various lithia-silica glasses containing very little or no sodium content have also been found to produce colored strengthened glass articles when treated in accordance with the teachings of the present invention.

The present invention will be further illustrated by the examples which follow.

EXAMPLE I

Sixteen glass sample 3⅛ inches by 3⅛ inches by 1/10 of an inch thick were fabricated using conventional melting and forming techniques out of the following base glass composition.

COMPOSITION "A"

| Oxide component: | Percent by weight |
|---|---|
| $SiO_2$ | 44.38 |
| $Al_2O_3$ | 26.61 |
| $Li_2O$ | 5.04 |
| $Na_2O$ | 11.0 |
| $P_2O_5$ | 9.96 |
| $ZnO$ | 3.00 |

An ion exchange coloring and strengthening bath herein after referred to as bath I was prepared using the following ingredients: silver nitrate 100 grams, and sodium nitrate 900 grams. The salts were melted in a stainless steel container placed in an electrical resistance muffle type furnace. No stirring mechanism was provided. A homogenous bath composition was established by natural convection currents resulting from the differential temperatures established in the various parts of the bath during heating.

The sodium nitrate-silver nitrate mixture was heated to a temperature of 850° F. until it became molten. The bath was maintained at this temperature for a period of about 1 hour prior to the ion exchange to insure that sufficient homogenization of the bath had occurred.

Each glass sample was then ion exchanged in the mixed ion molten salt bath by immersing the sample in the bath for a period of 90 minutes at a temperature of 850° F.

The samples were removed from the bath and cooled. The samples were found to be transparent and stained an amber color.

Table I shows the modulus of rupture strength exhibited by the test samples treated in the mixed ion exchange salt bath compared with the samples of the identical base glass composition not so ion exchanged.

Table I

| Sample No.: | Modulus of rupture (pounds per square inch) |
|---|---|
| 1 (untreated average of 8 samples) | 7,303 |
| Treated samples: | |
| 1 | 60,000 |
| 2 | 62,000 |
| 3 | 65,300 |
| 4 | 61,000 |
| 5 | 66,000 |
| 6 | 59,500 |
| 7 | 61,000 |
| 8 | 62,500 |

The modulus of rupture strength measurements were made using the concentric ring load test. The concentric ring load test consisted of supporting the sample being tested on a 3 inch diameter steel ring, above which is positioned a 1½ inch diameter steel ring which contacts the center of the specimen. The load is applied by lowering the 1½ inch ring onto the sample. The breaking load is measured and the modulus of rupture is calculated using the following formula:

$$S = .544W/T^2$$

Where S equals the modulus of rupture in pounds per square inch, W equals the load at failure in pounds and T equals the sample thickness in inches.

EXAMPLE II

In another embodiment of the present invention, fifteen samples 3⅛ inches by 3⅛ inches by 1/10 of an inch thick, of the same base glass composition noted in Example I, were ion exchanged in a mixed potassium nitrate-silver nitrate ion exchange bath.

The ion exchange bath of this example hereinafter referred to as bath II was prepared by mixing 900 grams of potassium nitrate and 100 grams of silver nitrate. The potassium and silver salts were melted together in a stainless steel container in the same manner as in Example I. The glass samples were then immersed, one at a time, in the mixed ion exchange bath for a period of 90 minutes each at a temperature of 850° F. After the ion exchange treatment, the samples were removed and found to be transparent and amber in color.

Table II shows the modulus of rupture strengths determined for the ion exchanged samples of the present example and the average of 5 control samples not ion exchanged using the same concentric ring loading test of Example I. The calculation of the modulus of rupture was made using the same formula presented in Example I.

TABLE II

| Sample No.: | Modulus of rupture (pounds per square inch) |
|---|---|
| Average of 5 untreated controls | 6,400 |
| Treated samples: | |
| 1 | 62,400 |
| 2 | 63,744 |
| 3 | 66,393 |
| 4 | 62,709 |
| 5 | 56,886 |
| 6 | 56,024 |
| 7 | 59,903 |
| 8 | 54,731 |
| 9 | 61,570 |
| 10 | 62,704 |

EXAMPLE III

In this embodiment of the present invention, the same base glass composition noted in Example I was used to produce glass samples 3⅛ inches by 3⅛ inches by 1/10 of an inch thick. The glass samples were immersed in the ion exchange baths of Example I and Example II for the times and temperatures indicated in Table III. Table III indicates the effect of various treating times and temperatures on the modulus of rupture strength of the glass samples. All tests and calculations were made as described in Example I.

TABLE III

| Sample No. | Exchange Bath No. | Treating Time, min. | Treating Temp., ° F. | Modulus of Rupture (Concentric ring loading test) |
|---|---|---|---|---|
| 1 | I | 5 | 850 | 79,000 |
| 2 | I | 30 | 850 | 91,000 |
| 3 | I | 60 | 850 | 83,000 |
| 4 | I | 90 | 850 | 61,200 |
| 5 | I | 30 | 650 | 93,300 |
| 6 | I | 90 | 650 | 97,500 |
| 7 | I | 90 | 950 | 26,500 |
| 8 | I | 5 | 950 | 60,000 |
| 9 | II | 5 | 850 | 108,000 |
| 10 | II | 30 | 850 | 87,000 |
| 11 | II | 60 | 850 | 68,400 |
| 12 | II | 90 | 850 | 56,200 |
| 13 | II | 30 | 650 | 94,500 |
| 14 | II | 90 | 650 | 108,000 |
| 15 | II | 90 | 950 | 20,300 |
| 16 | II | 5 | 950 | 80,500 |

EXAMPLE IV

Twelve samples of the following glass composition 3⅛ inches by 3⅛ inches by ¼ of an inch thick are fabricated using conventional melting and forming techniques.

COMPOSITION "B"

| Oxide component: | Percent by weight |
|---|---|
| $SiO_2$ | 56.38 |
| $Al_2O_3$ | 19.61 |
| $Li_2O$ | 5.04 |
| $Na_2O$ | 7.00 |
| $P_2O_5$ | 2.96 |
| ZnO | 2.00 |
| $B_2O_3$ | 5.00 |
| $ZrO_2$ | 2.00 |

Six of these samples are ion exchanged in a mixed molten salt exchange bath prepared by mixing 200 grams of copper nitrate, 200 grams of silver nitrate and 600 grams of sodium nitrate. The remaining six samples are ion exchanged in a mixed molten salt exchange bath prepared by mixing 200 grams of gold chloride, 200 grams of silver nitrate and 600 grams of potassium nitrate.

The exchanges are conducted for two hours at a temperature of about 820° F.

The copper-silver-sodium treated samples are transparent and tan-orange in color. The gold-silver-potassium treated samples are transparent and yellow in color.

EXAMPLE V

To indicate the chemical composition developed in the surface compressive layer due to the multiple ion exchange, a sample of glass having the base glass composition "A" given in Example I was ion exchanged in a bath containing 1 percent by weight silver nitrate and 99 percent by weight sodium nitrate for 90 minutes at a temperature of 850° F.

The glass sample thus treated was etched using a 1 percent by volume hydrofluoric acid and 1 percent by volume nitric acid aqueous solution to remove layers of glass approximately 10 microns thick. The dissolved glass in the etching solution was analyzed for each layer to determine its silver, sodium and lithium content. The results are tabulated below:

TABLE IV

| Etch No. | Approximate Midpoint Depth of Etch (Microns) | Grams of Glass Removed Per Etch | Percent By Weight | | |
|---|---|---|---|---|---|
| | | | Ag | Na | Li |
| 1 | .4 | .0295 | 13.52 | 10.6 | .23 |
| 2 | 5.3 | .3220 | 8.93 | 10.1 | .53 |
| 3 | 15.2 | .3118 | 7.41 | 9.8 | .74 |
| 5 | 24.0 | .3100 | 5.34 | 9.5 | .98 |
| 9 | 71.5 | .3023 | 3.76 | 9.1 | 1.31 |
| 13 | 110.8 | .3300 | 1.97 | 8.9 | 1.47 |
| 17 | 150.6 | .3268 | .48 | 9.0 | 1.69 |
| 21 | 190.4 | .3227 | .04 | 8.9 | 1.85 |
| 25 | 230.6 | .3228 | | 8.6 | 1.91 |
| 27 | 255.3 | .3291 | | 8.7 | 2.05 |
| 31 | 292.5 | .3300 | | 8.4 | 2.05 |
| 33 | 312.8 | .3155 | | 8.5 | 2.13 |

The base glass composition analyzed in Table IV contained 8.37 percent by weight sodium, 2.29 percent by weight lithium and was substantially free of silver. The analysis after the treatment verifies that both silver and sodium were exchanged into the glass to considerable depths with a corresponding loss of lithium content.

The calculation of the approximate mid-point depth of the various etches tabulated in Table IV was made assuming that the glass removed in each etch had a constant density of 2.5 grams per cubic centimeters. This assumption is not entirely accurate since the glass layers containing appreciable concentrations of silver would be expected to have densities higher than the assumed 2.5 value.

EXAMPLE VI

A sample of Composition "A" glass to which had been added .02 percent by weight cobalt oxide based on the total weight of the glass is prepared using conventional melting and forming techniques. The glass is transparent and blue in color prior to being ion exchanged. The glass is then ion exchanged for one hour at 850° F. in a mixed molten salt bath prepared by mixing 100 grams of silver nitrate and 900 grams of sodium nitrate.

After the ion exchange, the glass is transparent and green in color.

In the present invention, a wide range of colored and strengthened glass articles can be produced. Using the standard glass compositions "A" and "B" and various mixtures of silver and sodium and/or potassium salts, the complete range of light yellow to brown colors can be developed. By introducing minor additions of coloring ions, such as Fe, Co, Ni, Cr, Cu, Mn, and Au to these base glass compositions during melting as indicated in Example VI, a great many other colors can be developed.

In the present invention, the ion exchange bath preferably consists of a mixture of a silver salt and at least one alkali metal salt. The preferred salts are the nitrates, but other salts such as the chlorides, bromides, iodides, sulfates and carbonates may be used.

The preferred ion exchange salt bath incorporating only silver and sodium salts consists of from 0.5 to 20 percent by weight silver nitrate and from 80 to 99.5 percent by weight sodium nitrate, but the percent by weight sodium nitrate can range from 50 percent to 99.5 percent and still develop the advantages of the present invention. Ion exchange baths containing concentrations of silver nitrate greater than about 50 percent by weight based on the total weight of the bath are found to exhibit rapid decomposition of silver nitrate.

The preferred ion exchange salt bath incorporating only silver and potassium salts consists of in percent by weight of from 0.5 to 20 percent silver nitrate and from 80 to 99.5 percent potassium nitrate, but the percent potassium nitrate can range from 50 to 99.5 percent and still develop the advantages of the present invention. Similar decomposition of the silver nitrate may occur in this bath as may occur in the sodium-silver bath when the silver nitrate concentration in the bath exceeds about 50 percent by weight.

Ion exchanged baths consisting of three or more exchangeable ions can also be used as indicated in Example IV. In addition to combining two noble metal compounds and an alkali metal compound in a single treating bath, a single noble metal compound can be combined with two alkali metal compounds such as mixtures of silver, sodium and potassium nitrates. In such three-ion mixtures, the silver nitrate can range from 0.5 percent up to 50 percent by weight of the total weight of the bath and the combined sodium nitrate and potassium nitrate concentration can range from about 50 to 99.5 percent by weight of the total bath. The preferred ranges of these three components being silver nitrate 0.5 to 20 percent, sodium nitrate 10 to 50 percent, and potassium nitrate 30 to 89 percent. For example, a three ion mixed bath containing in percent by weight 10 percent $AgNO_3$, 45 percent $NaNO_3$, and 45 percent $KNO_3$ was found to produce a modulus of rupture for a Composition "A" sample of 72,500 p.s.i. when exchanged for a minute at 850° F. This sample was transparent and light yellow in color.

The same three ion bath on a Composition "A" sample exchanged for five minutes at 850° F. developed a modulus of rupture of 103,000 p.s.i. This sample was transparent and also a light yellow color.

In the present invention the greatest degree of coloration is produced when the silver nitrate content is between 10 and 50 percent by weight. The greatest degree of strength improvement is realized when the sodium and/or potassium content is between 75 and 99.5 percent by weight. The amount and shade of color developed in the glasses treated in accordance with the present invention can vary from an almost imperceptible color change to intense dark hues of various shades depending on the percent silver in the bath, the glass composition, the pre-ion exchange glass color, and the temperature and time of the treatment.

The ion exchange of the present invention is normally conducted from about 300° C. to the strain point of the glass but the bath is capable of being used anywhere from its melting temperature to its boiling point.

Typical of the many types of glass articles which can be produced by the techniques herein disclosed are optical and ophthalmic lenses. Sun glasses of various colors exhibiting high strength are possible, as are colored safety glasses.

Another area in which colored strengthened glass can be used is in the production of underwater pressure spheres. This application is of current interest due to the ability of glass to increase in strength when subjected to increases in pressure.

The technique is not limited to the production of colored transparent articles, but can be adapted to exchange relatively large quantities of silver to develop opaque reflecting films on glass. The opaque film in such a case is normally produced by heating the exchanged glass in a reducing atmosphere to precipitate atomic silver in the glass.

The base glass composition may also incorporate metal ions whose color is dependent upon the oxidation state in which they are present in the glass. The control of the melting atmosphere to establish various degrees of oxidation or reduction can be used to control these oxidation states and thus give added flexibility to the range of colors possible to develop in the glass.

While the present invention has been described with respect to specific embodiments, the scope of the invention should be limited only by the language of the appended claims.

We claim:

1. A method of treating glass by simultaneous multiple ion exchange of ions from the same treating bath to color and strengthen a base glass having a composition consisting in essential ingredients of percent by weight of 2.0 to 12.0 percent $Li_2$, 2.0 to 20.0 percent of an alkali metal oxide selected from the group consisting of sodium, potassium, and mixtures of sodium and potassium, 1.0 to 25.0 percent $P_2O_5$, 10.0 to 35.0 percent $Al_2O_3$, 30.0 to 65.0 percent $SiO_2$, 0 to 12.0 percent ZnO, 0 to 8.0 percent MgO, 10.0 percent $B_2O_3$, 0 to 8.0 percent $ZrO_2$ which comprises contacting the glass with a molten mixture comprising from about 50 to about 99.5 percent by weight of an alkali metal salt selected from the class consisting of sodium and potassium salts and from about 0.5 to 50 percent by weight of a silver metal salt at a temperature below the strain point and for a time sufficient to effect the desired result.

2. The method of claim 1 wherein the alkali metal salt is a potassium salt.

3. The method of claim 1 wherein the alkali metal salt is a sodium salt.

4. The method of claim 1 in which the silver salt is silver nitrate.

5. The method of claim 1 wherein the silver salt is silver nitrate present in about 0.5 to about 20 percent by weight.

6. The method of claim 5 wherein the alkali metal salt is an alkali metal nitrate.

7. The method of claim 1 wherein the composition consists essentially in percent by weight 3.0 to 6.0 percent $Li_2O$, 4.0 to 12.0 percent of an alkali metal oxide selected from the group consisting of sodium, potassium, and mixtures of sodium and potassium, 2.0 to 12.0 percent $P_2O_5$, 15.0 to 28.0 percent $Al_2O_3$, 40.0 to 60.0 percent $SiO_2$, 0 to 3.0 percent ZnO, 0 to 4.0 percent MgO, 0 to 7.0 percent $B_2O_3$, and 0 to 4.0 percent $ZrO_2$.

8. The article produced by the process of claim 1.
9. The article produced by the method of claim 7.

References Cited

UNITED STATES PATENTS 3,317,297   5/1967   Ray _____ 65—30
3,357,876   12/1967  Rinehart _____ 65—30

OTHER REFERENCES

Kistler, "Stresses in Glass Produced by Nonuniform Exchange of Monovalent Ions," J. Am. Chem. Soc., vol. 45, pp. 59–68 (1962).

HELEN M. McCARTHY, Primary Examiner

U.S. Cl. X.R.

106—52; 161—1

PO-1050
(5/69)

UNITED STATES PATENT OFFICE
CERTIFICATE OF CORRECTION

Patent No. 3,495,963      Dated February 17, 1970

Inventor(s) Michael J. Buckley et al

It is certified that error appears in the above-identified patent and that said Letters Patent are hereby corrected as shown below:

Column 8, line 49

"10.0 per cent" should be

--0 to 10.0 per cent--

SIGNED AND
SEALED
AUG 25 1970

(SEAL)
Attest:

Edward M. Fletcher, Jr.
Attesting Officer

WILLIAM E. SCHUYLER, JR.
Commissioner of Patents